United States Patent
Hahn et al.

(10) Patent No.: US 6,334,966 B1
(45) Date of Patent: Jan. 1, 2002

(54) CHEMICAL OXIDATIVE PREPARATION OF CONDUCTIVE POLYMERS

(75) Inventors: Randolph S. Hahn; Philip M. Lessner; Brian J. Melody, all of Simpsonville; John T. Kinard, Greer, all of SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/705,913

(22) Filed: Nov. 6, 2000

(51) Int. Cl.$^7$ ............... H01B 1/12; B05D 1/18; B05D 3/10; B05D 5/12
(52) U.S. Cl. ............... 252/500; 427/80; 427/318; 427/337; 427/435
(58) Field of Search ............... 252/500; 427/80, 427/318, 337, 435

(56) References Cited

U.S. PATENT DOCUMENTS

| | | | |
|---|---|---|---|
| 4,697,001 A | * 9/1987 | Walker et al. | 528/423 |
| 4,910,645 A | 3/1990 | Jonas et al. | |
| 5,567,209 A | * 10/1996 | Kobayashi et al. | 29/25.03 |
| 5,986,046 A | * 11/1999 | Nishiyama et al. | 528/423 |
| 6,136,372 A | * 10/2000 | Lessnet et al. | 427/213.3 |
| 6,206,937 B1 | * 3/2001 | Kudoh et al. | 29/25.03 |

FOREIGN PATENT DOCUMENTS

EP 0893807 A2 1/1999

* cited by examiner

Primary Examiner—Mark Kopec
(74) Attorney, Agent, or Firm—Banner & Witcoff, Ltd.

(57) ABSTRACT

An intrinsically conductive polymer is prepared with a chemical oxidative process. The polymer is prepared by first dipping or coating a substrate with an Fe(III)-containing oxidizer solution and drying. The substrate is then dipped or coated with a monomer, such as 3,4-ethylenedioxythiophene solution, and reacted to form the conductive polymer. The monomer is dissolved in a solvent in which it has a high solubility but in which the Fe(III)-containing oxidizer has low solubility. This minimizes cross-contamination of the monomer and oxidizer dipping solutions thereby making this process suitable for high volume production. Dissolving the monomer in a solvent allows control over the stoichiometric ratio of monomer to oxidizer and prevents an excess of monomer thereby facilitating the removal of any unreacted monomer by water. The substrate is then dipped in an aqueous solution of para-toluenesulfonic acid to facilitate the removal of Fe(II) byproducts by enhancing their solubility in water and then the substrate may be washed with an aqueous solution or pure water. The process produces low ESR and low leakage valve metal capacitors with conductive polymer cathodes.

19 Claims, No Drawings

CHEMICAL OXIDATIVE PREPARATION OF CONDUCTIVE POLYMERS

FIELD OF THE INVENTION

The invention is directed to preparation of conductive polymers using chemical oxidation.

BACKGROUND OF THE INVENTION

A solid state electrolytic capacitor is comprised of three basic elements, the anode, the dielectric, and the cathode. Valve metals such as tantalum, aluminum, and niobium are particularly suited for the manufacture of high surface area solid electrolytic capacitors in which the valve metal serves as the anode, and an oxide of the valve metal formed by anodic oxidation of the valve metal surfaces serves as the dielectric. In order to maximize the dielectric surface area, and hence increase the volumetric efficiency of the capacitor, the valve metal substrates are porous bodies. Conductive polymers such as polythiophene, polypyrrole, polyaniline, and their derivatives are finding increased utilization as the cathode for these capacitors.

Conductive polymers offer several advantages over manganese dioxide, the traditional cathode material utilized for solid electrolytic capacitors manufactured from valve metals. The conductive polymer can be applied to the dielectric surfaces of the capacitors using process temperatures that do not cause harm to the dielectric. The polymers are non-oxidizing, eliminating the potential for ignitions. The conductive polymers are highly conductive, typically 10 to 100 times as conductive as manganese dioxide. The higher conductivity of the conductive polymer results in a substantial reduction in equivalent series resistance (ESR) for the finished capacitor relative to devices manufactured with manganese dioxide. Low ESR is an increasingly important requirement in several capacitor applications, including voltage regulation for microprocessors.

Chemical oxidative polymerization is an effective way to coat the dielectric surfaces of a valve metal solid electrolytic capacitor. In chemical oxidative polymerization, a monomer, oxidizing agent, and a dopant are reacted on the dielectric surfaces to form the conductive polymer. Several methods have been used to get the monomer, oxidizer, and dopant to react on the dielectric surface. In one method, all components are mixed together in a combined solution. However, the monomer and oxidizer can react in the dipping bath, causing premature polymerization, adding processing costs and degrading the quality of the capacitor. This is especially a problem with pyrrole monomer and Fe(III) oxidizing agents.

In an alternate dip approach, the dielectric surfaces are first immersed in a solution containing one reactant (either dilute monomer or oxidizer/dopant), drying, and then dipping in the second reactant. If a porous pellet is first dipped in a dilute monomer solution, the monomer tends to be drawn into the porous pellet on drying, making it difficult to coat the external surfaces of the valve metal substrate.

In a preferred method, the dielectric surfaces are coated with oxidizer solution by dipping in a solution containing the oxidizer and dopant. The oxidizer solution is dried on the dielectric surfaces. Monomer is applied by dipping in a solution containing the monomer. The monomer, oxidizer, and dopant react to form a conductive polymer film on the dielectric surface.

Suitable monomers include aniline, pyrrole, thiophene, and derivatives of these monomers. A derivative of thiophene, 3,4-ethylenedioxythiophene is particularly preferred because the polymer produced, poly(3,4-ethylenedioxythiophene) has a high stability in hot and humid environments.

After coating the dielectric surface with the conductive polymer, the excess reactants and reaction byproducts must be removed. Due to the moderate to low solubility of most suitable monomers, organic solvents must be used to wash away excess monomer from the dielectric surface. The preferred monomer, 3,4-ethylenedioxythiophene, has a low solubility in pure water (2.1 grams/liter at 25° C.). In the preferred case where Fe(III) salts are utilized as the oxidizer, the Fe(II) by products of the polymerization reaction are removed by an organic solvent because of the low solubility of Fe(II) salts in pure water. Failure to remove excess monomer and Fe(II) can cause ESR and/or leakage current of the finished device to increase. The use of organic solvents to remove excess monomer and Fe(II) from the dielectric surface substantially increases manufacturing costs due to the raw material cost of the organic solvent, the disposal cost of the used wash solution, and the capital costs associated with building equipment compatible with the use of flammable solvents.

In order to avoid using organic solvents to wash away excess monomer following the polymerization reaction, the concentrations of monomer and oxidizer must be matched to insure complete, or nearly complete, polymerization of the monomer present on the dielectric surfaces. It has been found that it is very difficult to completely coat external surfaces of a porous pellet using a single dip solution comprising oxidizer, monomer, and dopant unless the concentrations of monomer and oxidizer are very high. In such solutions premature polymerization occurs. Thus an alternate dip approach in which the oxidizer is applied followed by dipping in the monomer is the preferred approach. The monomer solution must be diluted with a solvent in order to stoichiometrically match the amount of oxidizer available to drive the polymerization reaction.

It is thus preferred to avoid the use of organic solvents when removing Fe(II) from the dielectric surfaces. There have been attempts to use water as the solvent. For example, Sakata et al. (EP 0 893 807 A2) disclose a method in which an Fe(III)-containing salt is applied to a capacitor, dried, and then the capacitor is dipped in a solution of pyrrole monomer in water followed by polymerization to polypyrrole. If the Fe(III)-containing salt has a low solubility in water, this prevents cross contamination of the pyrrole with the oxidizer. However, this method is not applicable to Fe(III)-containing salts that have significant solubility in water (such as Fe(III) tosylate), and it is also not applicable to monomers that are sparingly soluble in water such as 3,4-ethylenedioxythiophene. Fe(III) tosylate is the preferred oxidizer/dopant for converting 3,4-ethylenedioxythiophene into poly(3,4-ethylenedioxythiophene) the process of Sakata does not solve the problems.

Sakata is silent on the method of washing the excess pyrrole and Fe(II) reaction byproducts. Historically, this process would require the use of an organic solvent to remove the excess hydrophobic monomer and the Fe(II) reaction byproduct.

SUMMARY OF THE INVENTION

It is an object of the invention to coat or impregnate articles with highly conductive polymers made from hydrophobic monomers and Fe(III)-containing oxidizers using a chemical oxidative process which eliminates the need for washing with an organic solvent.

It is another object of this invention to control the amount of monomer applied to the substrate by dissolving the monomer in a solvent in which it is soluble and thereby limit the amount of hydrophobic monomer that must be removed during an aqueous washing step.

It is yet another object of this invention to develop an aqueous wash process which effectively removes Fe(II) residues formed as a by product of the reaction between a monomer and Fe(III) oxidizer. Preferably the capacitor is soaked in a solution which enhances the solubility of Fe(II). The capacitor may then be washed in water.

It is a further object of the present invention to substantially reduce cross contamination of dilute solutions of monomer by Fe(III) oxidizers by dissolving the monomer in a solvent in which the monomer is soluble but the Fe(III) oxidizer is substantially insoluble.

It is another object of this invention to apply this process to the production of low ESR and low leakage valve metal capacitors with conductive polymer cathodes.

The present invention is directed to a process of preparing conductive polymer layer on an anodized surface of a valve metal substrate comprising a) dipping the substrate in a solution of iron salt of an organic or inorganic acid solution, b) drying, and c) dipping the substrate in a monomer solution; wherein the monomer solution comprises a solvent in which the monomer is soluble and the iron salt of an organic or inorganic acid is not soluble.

The invention is particularly directed to the process wherein the iron salt is iron toluene sulfonate and the monomer is 3,4-ethylenedioxythiophene. Preferably the solvent is butyl acetate.

The invention is further directed to the process of preparing conductive polymers as described above further comprising, after dipping the substrate in a monomer solution, washing the substrate in an aqueous acidic solution, such as para-toluene sulfonic acid, and washing the substrate with water.

DETAILED DESCRIPTION OF THE PREFERRED EMBODIMENTS

The present invention is directed to improving a process of forming conductive polymers using chemical oxidation.

A valve metal is prepared with a dielectric surface. 'Valve metals' are those metals which form protective high resistance oxide films on anodic polarization to the exclusion of all other electrochemical processes (Anodic Oxide Films; L. Young, 1961). Examples of valve metals include tantalum, aluminum, niobium, titanium, zirconium, hafnium, and their compounds and alloys. For convenience, the invention will be described using a tantalum capacitor. However, using other valve metals, alloys, and compounds is fully contemplated and within the scope of the invention.

A polymer layer is then formed on the anodized substrate. Typically, the anodized substrate is dipped in an oxidizer solution (such as Fe(III) salt solution), dried, and then dipped in a monomer solution (such as a dilute thiophene monomer solution.) However, there is a high likelihood of cross contamination of the monomer solution due to the oxidizer dried on the substrate.

It was discovered that if the monomer is present in a solution comprising a solvent in which the monomer is highly soluble but in which the oxidizer is not soluble, very little, if any, cross contamination will occur. For example, the monomer 3,4-ethylenedioxythiophene is highly soluble in butyl acetate, but iron para-toluene sulfonate, a preferred oxidizer for the polymerization reaction, is not soluble in butyl acetate. Cross contamination of the monomer solution was significantly retarded when pellets coated with iron para-toluene sulfonate were dipped in dilute solutions of 3,4-ethylenedioxythiophene in butyl acetate. This reduction of cross contamination of the dilute monomer solution provides a process that is suitable for the manufacture of capacitors.

Thus, monomer solution contamination can be reduced by using a solvent in which the monomer is highly soluble, but the oxidizer is insoluble. Further, using dilute monomer solutions that stoichiometrically balance monomer and oxidizer in an alternate dip process, eliminates the need to remove excess monomer following a chemical oxidative process. Fe(II) residues can be removed by washing in an aqueous solution containing a suitable acid, such as para-toluene sulfonic acid.

Thus, in accordance with the invention, a sintered and anodized substrate, such as a tantalum pellet, is dipped in an oxidizer solution. The oxidizer solution contains an iron salt of an organic or inorganic acid. Preferably the oxidizer is iron toluene sulfonate. Other oxidizers include, but are not limited to, $FeCl_3$, $Fe(ClO_4)_3$, and iron methane sulfonate.

The concentration of the iron in solution is about 10,000 $\mu$g Fe(III)/g solution to about 70,000 $\mu$g Fe(III)/g solution, preferably about 20,000 $\mu$g Fe(III)/g solution to about 60,000 $\mu$g Fe(III)/g solution.

The oxidizer solution is dried at a temperature from 0 to about 150° C., preferably from about 15 to about 40° C.

Repeated dips in the oxidizer solution may be made to reduce the number of monomer dip cycles required and to provide improved polymer coverage of external surfaces of a porous substrate. Typically, the process of dipping the substrate in the oxidizer solution and drying may be repeated 1 to 5 times, preferably 1 to 3 times, prior to dipping in the monomer solution.

The substrate is next dipped in a dilute monomer solution. The monomer is diluted with a solvent in which the monomer is soluble, but the iron salt is not soluble. Polymerization is allowed to occur at temperatures from about 0 to about 150° C., preferably from about 15 to about 40° C.

The monomer may be any suitable monomer, such as aniline, thiophene, and their derivatives. Preferably the monomer is 3,4-ethylenedioxythiophene The solvent may be any suitable solvent in which the monomer is soluble, but the iron salt is not, including, but not limited to, esters such as butyl acetate, ketones, aldehydes, ethers, and aromatic hydrocarbons such as turpentine. Preferably, the solvent is butyl acetate. The solvent used depends on which oxidizer is used since the oxidizer should not be soluble in the solvent.

The concentration of the monomer solution is such that an excess of oxidizer is present on the pellets following the monomer dip. Preferably, the concentration of monomer in solution is from about 3 wt % to about 40 wt %, more preferably from about 10 wt % to about 30 wt %, most preferably about 20 wt %.

The pellets are washed in an aqueous acidic solution to remove Fe(II) residues. The aqueous acidic solution enhances the solubility of Fe(II) in water. Suitable acidic solutions include, but are not limited to, aqueous sulfonic acids. Aqueous solutions of Fe(II) complexing agents such as 1,10-phenanthroline are also suitable. Preferably the aqueous acidic solution is a para-toluene sulfonic acid solution having at least 0.1 wt %, preferably about 0.5 to about 10 wt %, and most preferably about 2 wt %, para-toluenesulfonic acid.

The temperature of the acidic solution is typically from about 0 to about 100° C., preferably from about 25 to about 60° C.

After the pellets are washed in the aqueous acidic solution, they may be given a final wash in water to remove excess para-toluene sulfonate. Elevated temperatures accelerate the wash process. The temperature of the water is typically from about 0 to about 100° C., preferably from about 25 to about 70° C.

After the polymerization process, the pellets are reanodized to heal defects in the dielectric surface, and typically externally coated with layers of carbon and silver paint prior to electrical testing of the capacitor.

The invention will be further described by reference to the following examples. These examples should not be construed in any way as limiting the invention.

EXAMPLES
Preparation of Sintered Pellets

Pellets of dimension 0.182×0.128×0.032 inches were pressed from commercially available capacitor grade tantalum powder. The pellets were sintered to create tantalum anodes with 48,000 CV/g. These pellets were used in the following examples.

Example 1

A group of sintered pellets were anodized in a phosphoric acid and water electrolyte to 20 volts at 60° C. The pellets were dipped in an iron toluene sulfonate solution containing 27,500 $\mu$g Fe(III)/g solution. The pellets were dried at 24° C. for 2 hours. The pellets were subsequently dipped in a solution containing 5 wt percent 3,4-ethylenedioxythiophene in butyl acetate. The polymerization reaction was carried out at 24° C. for 30 minutes. The pellets were washed in a 5 wt percent para-toluene sulfonic acid in water solution at 60° C. for 30 minutes. The pellets were given a final wash in DI (distilled) water at 70° C. for 1 hour. This process cycle was repeated 3 times.

In order to build up the conductive polymer thickness on the external surfaces of the pellet, the process was repeated using an iron toluene sulfonate solution of concentration 33,000 $\mu$g Fe(III)/g solution. The pellets were dipped in the oxidizer solution four times with a 30 minute dry between dips. After the fourth oxidizer dip the pellets were dried for a 90 minutes, then dipped in a solution containing 20 weight percent 3,4 ethylenedioxythiophene in butyl acetate. The pellets were then washed in para-toluene sulfonic acid and DI water, as above. This process cycle was repeated 4 times. The total iron content in the pellets was determined to be 2.094 $\mu$g/pellet using inductively coupled plasma spectrophotometry (ICP).

The dilute monomer solutions showed no evidence of contamination, even after sitting for several days. Following the application of carbon and silver paint layers, the ESR of the capacitors was measured. The leakage current of the capacitors was measured after encapsulation. These data are presented in Table 1.

Comparative Example 1

A group of sintered pellets were processed by anodizing and polymerizing under the same conditions as specified in Example 1 except the pellets were not washed in an aqueous para-toluene sulfonic acid solution as described in Example 1. The total iron content in the pellets was determined to be 112.3 $\mu$g/pellet using inductively coupled plasma spectrophotometry (ICP). Following the application of carbon and silver paint layers the ESR of the capacitors was measured. The leakage current of the capacitors was measured after encapsulation. This data is presented in Table 1. The high iron levels in the pellets cause high leakage levels after encapsulation.

TABLE 1

| Example | p-TSA wash | ESR (m$\Omega$) | Leakage ($\mu$A) | Shorts (excluded from parametric leakage) |
|---|---|---|---|---|
| 1 (Inv.) | Yes | 36.8 | 0.69 | 0/120 |
| 1 (Comp.) | No | 37.4 | 10.24 | 10/120 |

Comparative Example 2

A group of sintered pellets was anodized in a phosphoric acid and water electrolyte to 20 volts at 60° C. The pellets were dipped in an iron toluene sulfonate solution containing 27,500 $\mu$g Fe(III)/g solution. The pellets were dried at 24° C. for 2 hours. The pellets were subsequently dipped in a solution containing 5 weight percent 3,4 ethylenedioxythiophene in 2-propanol. The monomer solution was immediately contaminated and unsuitable for continued use.

Comparative Example 3

A group of sintered pellets was anodized in a phosphoric acid and water electrolyte to 20 volts at 60° C. The pellets were dipped in an iron toluene sulfonate solution containing 27,500 $\mu$g Fe(III)/g solution. The pellets were dried at 24° C. for 2 hours. The pellets were subsequently dipped in a solution containing 5 wt percent 3,4-ethylenedioxythiophene in butyl acetate. The polymerization reaction was carried out at 24° C. for 30 minutes. The parts were washed in a 5 wt percent para-toluene sulfonic acid in water solutions at 60° C. for 30 minutes. The pellets were given a final wash in DI water at 70° C. for 1 hour. This process cycle was repeated 3 times.

In order to build up the conductive polymer thickness on the external surfaces of the pellet, the process was repeated using an iron toluene sulfonate solution of concentration 33,000 $\mu$g Fe(III)/g solution. Two conditions were tested:

First test: The pellets were dipped in the oxidizer solution four times with a 30 minute dry between dips. After the fourth oxidizer dip, the pellets were dried for a 90 minutes, then dipped in a solution containing 40 weight percent 3,4 ethylenedioxythiophene in butyl acetate. This process cycle was repeated 4 times.

Second test: the pellets were dipped in the iron toluene sulfonate oxidizer solution twice per cycle.

After the second oxidizer dip the pellets were dipped in a solution containing 80 wt percent 3,4-ethylenedioxythiophene in butyl acetate. As with the first test this process cycle was repeated 4 times. Following the application of carbon and silver paint layers the ESR of the capacitors were measured. The data in Table 2 demonstrates the negative effect on ESR of having excess monomer present.

Comparative Example 4

A group of sintered pellets was anodized in a phosphoric acid and water electrolyte to 20 volts at 60° C. The pellets were dipped in an iron toluene sulfonate solution containing 27,500 µg Fe(III)/g solution. The pellets were dried at 24° C. for 2 hours. The pellets were subsequently dipped in undiluted 3,4-ethylenedioxy-thiophene. The polymerization reaction was carried out at 24° C. for 30 minutes. Following polymerization, the pellets were washed in methanol for 1 hour to remove excess monomer and the Fe(II) by products of the reaction. The pellets were then washed in water for 30 minutes to remove any residual water-soluble species. This process cycle was repeated 3 times.

In order to build up the conductive polymer thickness on the external surfaces of the pellet, the process was repeated using an iron toluene sulfonate solution of concentration 33,000 µg Fe(III)/g solution. The parts were dried and dipped in undiluted 3,4-ethylenedioxythiophene. This process cycle was repeated 4 times with 1–2 dips in the iron toluene sulfonate at each cycle. Following the application of carbon and silver paint layers the ESR and leakage of the capacitors were measured. These data are presented in Table 2.

The data indicate that the ESR obtained with a process using undiluted monomer and an organic solvent to wash away excess monomer following polymerization is equivalent to that obtained with a process using dilute monomer in which the amount of monomer and oxidizer are stoichiometrically balanced and by products of the polymerization reaction are removed by aqueous wash solutions.

TABLE 2

| Example | Wash Process | % monononer last 5 cycles | ESR (mΩ) |
| --- | --- | --- | --- |
| 1 (Inv) | p-TSA + water | 20% | 36.8 |
| 3 (Comp.) | p-TSA + water | 40% | 73 |
| 3 (Comp.) | p-TSA + water | 80% | 95.3 |
| 4 (Comp.) | methanol | 100% | 36.6 |

It will be apparent to those skilled in the art that various modifications and variations can be made in the compositions and methods of the present invention without departing from the spirit or scope of the invention. Thus, it is intended that the present invention covers the modifications and variations of this invention provided they come within the scope of the appended claims and their equivalents.

What is claimed:

1. A process of a preparing a conductive polymer layer on an anodized surface of a valve metal substrate comprising a) dipping the substrate in a solution of an iron salt of an organic or inorganic acid solution, b) drying, and c) dipping the substrate in a monomer solution and polymerizing; wherein the monomer solution comprises a solvent in which the monomer is soluble and the iron salt of an organic or inorganic acid is not soluble.

2. The process of claim 1 wherein the iron salt of an organic or inorganic acid is iron toluene sulfonate.

3. The process of claim 1 wherein the concentration of the iron salt of an organic or inorganic acid is about 10,000 µg Fe(III)/g solution to about 70,000 µFe(III)/g solution.

4. The process of claim 3 wherein the concentration of the iron salt of an organic or inorganic acid is about 20,000 µg Fe(III)/g solution to about 60,000 µg Fe(III)/g solution.

5. The process of claim 1 wherein the monomer is 3,4-ethylenedioxythiophene.

6. The process of claim 1 wherein the concentration of monomer in solution is about 3 to about 40 wt % monomer based on total weight of the solution.

7. The process of claim 6 wherein the concentration of monomer in solution is about 10 to about 30 wt % monomer based on total weight of the solution.

8. The process of claim 1 wherein steps a) and b) are repeated 1 to 5 times prior to step c).

9. The process of claim 1 wherein b) further comprises drying at a temperature of about 0 to about 150 C.

10. The process of claim 1 wherein the solvent comprises butyl acetate.

11. The process of claim 1 further comprising, after dipping the substrate in a monomer solution and polymerizing, d) washing the substrate in an aqueous acidic solution.

12. The process of claim 11 wherein the aqueous acidic solution comprises sulfonic acids or Fe(II) complexing agents.

13. The process of claim 12 wherein the aqueous acidic solution comprises at least about 0.1 wt % para-toluene sulfonic acid based on the total weight of the solution.

14. The process of claim 13 wherein the aqueous acidic solution comprises about 1 to about 10 wt % para-toluene sulfonic acid based on the total weight of the solution.

15. The process of claim 11 further comprising, after washing with the acidic solution, e) washing the substrate in water.

16. The process of claim 15 further comprising repeating steps a) through e) from 1 to 15 times.

17. The process of claim 16 wherein the concentration of Fe(III) in solution is different for at least one of the repeating steps.

18. The process of claim 1 wherein the anodized substrate is prepared by anodizing a sintered substrate in an aqueous phosphoric acid electrolyte.

19. The process of claim 1 wherein the valve metal is selected from the group consisting of tantalum, aluminum, niobium, titanium, zirconium, hafnium, and compounds and alloys thereof.

* * * * *